United States Patent [19]

Carroll, Jr.

[11] 4,046,837

[45] Sept. 6, 1977

[54] POLYESTER-POLYOLEFIN BLEND FILM OR COATING COMPOSITION

[75] Inventor: Max L. Carroll, Jr., Kingsport, Tenn.

[73] Assignee: Eastman Kodak Company, Rochester, N.Y.

[21] Appl. No.: 739,370

[22] Filed: Nov. 5, 1976

Related U.S. Application Data

[63] Continuation of Ser. No. 293,298, Sept. 25, 1972, abandoned.

[51] Int. Cl.$^2$ .................. C08L 67/00; C08L 23/06
[52] U.S. Cl. .................. 260/873; 428/458; 428/481
[58] Field of Search .................. 260/873, 75 R

[56] References Cited

U.S. PATENT DOCUMENTS

| | | | |
|---|---|---|---|
| 3,256,362 | 6/1966 | Craubner et al. | 260/873 X |
| 3,361,848 | 1/1968 | Siggel et al. | 260/873 |
| 3,534,120 | 10/1970 | Andos et al. | 260/873 |
| 3,579,609 | 5/1971 | Sevenich | 260/873 |
| 3,657,389 | 4/1972 | Caldwell et al. | 260/873 |

*Primary Examiner*—Theodore E. Pertilla
*Attorney, Agent, or Firm*—William P. Heath, Jr.; Daniel B. Reece, III

[57] ABSTRACT

Poly(tetramethylene terephthalate) having an inherent viscosity of from about 0.6 to about 1.4 is modified by the addition of from about 5 to about 35 percent by weight of polyethylene having a density of about 0.918 gm./cc. and a melt index from about 0.1 to about 10.0 to provide an extrusion film or coating composition especially for the coating of substrates at very high line speeds, while resulting in consistent coating characteristics.

3 Claims, No Drawings

POLYESTER-POLYOLEFIN BLEND FILM OR COATING COMPOSITION

This invention relates to blends of poly(tetramethylene terephthalate) and polyethylene for use in film or extrusion coating onto various substrates such as paper or cellulosic, aluminum foil and cellophane for uses such as bake-in trays, release sheets and the like wherein heat resistance is required. This formulation has relatively high heat resistance as compared to polyethylene or polypropylene, both of which are used extensively in the field today.

Unmodified poly(tetramethylene terephthalate) can be extrusion coated with only a limited amount of success in that the maximum coating speeds are relatively low. At line speeds in the range of 200 ft./min., the consistency of the coating becomes very erratic due to "draw resonance" which is believed to be a result of the material's poor melt strength.

Objects, therefore, of the present invention are: to provide a poly(tetramethylene terephthalate based film or coating composition having especially excellent high speed processing characteristics; and to provide films and substrates coated therewith.

These and other objects hereinafter appearing have been attained in accordance with the present invention through the discovery that high line speeds can be obtained by compounding polyethylene in the poly(tetramethylene terephthalate) at levels of 5 to 35 percent by weight of the total composition, 15 to 25 percent by weight being preferred. At the 20 percent polyethylene by weight level, line speeds of 500 ft./min. can be obtained with a consistent coating.

The poly(tetramethylene terephthalate) useful in the present invention has an I.V. of from about 0.6 to about 1.4 as measured in 60/40 ratio by weight of phenol/tetrachloroethane at 23° C at a concentration of 0.25 g./100 ml. The useful polyethylenes have a density of about 0.918 gm./cc. and a melt index of from about 0.1 to about 10.0, preferably from about 2.5 to about 4.5, as determined by ASTM D1238 at 190° C. and 2.16 kg.

The present invention includes compositions and substrates coated therewith, the compositions comprising a blend of poly(tetramethylene terephthlate) having an I.V. of from about 0.6 to about 1.4, with from about 5 to about 35 percent by weight of polyethylene having a density of about 0.918 and a melt index of from about 0.1 to about 10.0, said blend having a flow rate of from about 10 to about 30 gm./10 min. as determined by ASTM D1238 at 250° C. and 2.16 kg.

Various stabilizers, slip agents, fillers, plasticizers and the like conventional in the art may be incorporated into the present blends as desired.

EXAMPLE 1

A blend of 20 percent by weight of polyethylene (melt index = 3.50 gm./10 min., density = 0.918 gm./cc.) and 80 percent by weight of poly(tetramethylene terephthalate) (I.V. 32 0.98) is compounded through extrusion. The flow rate is about 22. This material was then coated by melt extrusion with a 3½ inch Eagan extrusion coating apparatus onto 40 pound kraft paper at line speeds up to 425 ft./min. The coating weights or thicknesses of about 0.8 mil were checked and found to be very consistent.

EXAMPLE 2

A blend of 20 percent by weight of polyethylene (melt index = 0.25 gm./10 min., density = 0.918 gm./cc.) and 80 percent by weight of poly(tetramethylene terephthalate) (I.V. = 0.98) is compounded through extrusion. The flow rate is about 13. This material was then coated onto 40 pound kraft paper at line speeds up to 500 ft./min. The coating weights or thicknesses of about 0.6 mil were checked and found to be very consistent.

EXAMPLE 3

The data set forth in Table 1 of this example demonstrate the criticality of the density and melt index of the polyethylene in the blends of this invention.

Table 1

| Percent Poly(tetramethylene terephthalate)* | Percent Polyethylene | Melt Index of Polyethylene | Density in gm/cc. | Flow Rate of Blend | Edge Weave | Max. Line Speed | Basis Wt. (wt. in Lbs. of 3000 Sq. Ft. of Coating) |
|---|---|---|---|---|---|---|---|
| 100 | 0 | — | — | — | 2" | 100 ft/min. | 37.2 |
| 80 | 20 | 0.25 | .918 | 13 | 0" | 300 ft/min. | 15.2 |
| 80 | 20 | 6.6 | .917 | 14 | 0" | 300 ft/min. | 12.3 |
| 80 | 20 | 14.0 | .916 | 14 | ¼" | 250 ft/min. | 14.5 |
| 80 | 20 | 0.6 | .930 | 10 | 1" | 150 ft/min. | 27.7 |
| 80 | 20 | 5.9 | .935 | 14 | ¼" | 200 ft/min. | 16.3 |
| 80 | 20 | 10.0 | .930 | 14 | 1" | 100 ft/min. | 35.3 |
| 80 | 20 | 0.2 | .950 | 7 | Web "tear-off" at | 100 ft/min. | |
| 80 | 20 | 8.1 | .950 | 13 | 1" | 150 ft/min. | 27.9 |

*The poly(tetramethylene terephthalate) used had an inherent viscosity of 1.0 and its density was about 1.3 gm./cc.

In considering the data set forth in Table 1 it is seen that the polyethylene having a melt index of between about 0.1 and about 10 and having a density of about 0.918 resulted in higher relative line speeds in ft./min. (second and third runs) as well as no edge weave. Further, the comparative runs show that polyethylene having a melt index within the range of 0.1 to 10 but having a higher density (fifth through ninth runs) had lower relative line speeds and edge weave deficiencies.

Although the invention has been described in considerable detail with particular reference to certain preferred embodiments thereof, variations and modifications can be effected within the spirit and scope of the invention.

I claim:

1. The composition comprising a blend of poly(tetramethylene terephthalate) having an inherent viscosity in ml./g. of from about 0.6 to about 1.4, with from about 5 to about 35 percent by weight of polyethylene having a density of about 0.918 gm./cc. and a melt index of from about 0.1 to about 10.0, said blend having a flow rate of from about 10 to about 30 gm./10 min. as determined as ASTM D1238 at 250° C. and 2.16 kg.

2. The composition of claim 1 wherein the polyethylene content is from about 15 to about 25 percent by weight.

3. A film of the composition of claim 1.